(12) United States Patent
Chen

(10) Patent No.: US 10,067,281 B2
(45) Date of Patent: Sep. 4, 2018

(54) BACKLIGHT MODULE AND LIQUID CRYSTAL DISPLAY

(71) Applicant: Radiant Opto-Electronics Corporation, Kaohsiung (TW)

(72) Inventor: Jui-Lin Chen, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 15/437,424

(22) Filed: Feb. 20, 2017

(65) Prior Publication Data

US 2017/0162135 A1 Jun. 8, 2017

Related U.S. Application Data

(63) Continuation of application No. 14/987,773, filed on Jan. 5, 2016, now Pat. No. 9,618,677, which is a continuation-in-part of application No. 14/056,964, filed on Oct. 18, 2013, now Pat. No. 9,268,081.

(30) Foreign Application Priority Data

Jul. 17, 2013 (TW) .............................. 102125600 A

(51) Int. Cl.
*G02F 1/1333* (2006.01)
*G02F 1/1335* (2006.01)
*F21V 8/00* (2006.01)

(52) U.S. Cl.
CPC ........... *G02B 6/0021* (2013.01); *G02B 6/002* (2013.01); *G02B 6/009* (2013.01); *G02B 6/0055* (2013.01); *G02B 6/0083* (2013.01); *G02B 6/0088* (2013.01); *G02F 1/133308* (2013.01); *H05K 999/99* (2013.01); *G02B 6/0013* (2013.01); *G02F 1/133512* (2013.01); *G02F 1/133524* (2013.01); *G02F 1/133615* (2013.01); *G02F 2001/133314* (2013.01); *G02F 2202/28* (2013.01)

(58) Field of Classification Search
CPC .................................................... G02B 6/0013
See application file for complete search history.

(56) References Cited

U.S. PATENT DOCUMENTS

| 2004/0141305 | A1* | 7/2004 | Higashiyama | ....... G02B 6/0021 362/612 |
| 2005/0259443 | A1* | 11/2005 | Lin | ...... G02B 6/0091 362/632 |
| 2009/0103328 | A1* | 4/2009 | Iwasaki | ............... G02B 6/0041 362/617 |
| 2009/0237592 | A1* | 9/2009 | Mizutani | .............. G02B 6/0021 349/62 |

\* cited by examiner

*Primary Examiner* — Wen-Ying P Chen
(74) *Attorney, Agent, or Firm* — CKC & Partners Co., Ltd.

(57) ABSTRACT

A light guide assembly, a backlight module and a liquid crystal display (LCD) are provided. The backlight module includes a back plate, light guide plate, an adhesive member and a light source. The light guide plate is disposed on the back plate and includes a first optical surface, a second optical surface and a light-incident surface. The first optical surface is opposite to the second optical surface. The light-incident surface connects the first optical surface and the second optical surface. The first optical surface or the second optical surface of the light guide plate is set with a recess. The adhesive member is disposed in the recess to adhere the light guide plate to the back plate. The light source is disposed on the back plate and emits light toward the light guide plate.

11 Claims, 12 Drawing Sheets

US 10,067,281 B2

BACKLIGHT MODULE AND LIQUID CRYSTAL DISPLAY

RELATED APPLICATIONS

This application is a continuation application of U.S. application Ser. No. 14/987,773, filed on Jan. 5, 2016, which is a continuation-in-part application of U.S. application Ser. No. 14/056,964, filed on Oct. 18, 2013, now U.S. Pat. No. 9,268,081 which claims priority to Taiwan Application Serial Number 102125600, filed Jul. 17, 2013. The entire disclosures of all the above applications are hereby incorporated by reference herein.

BACKGROUND

Field of Invention

The present invention relates to a light source module. More particularly, the present invention relates to a light guide assembly, a backlight module and a liquid crystal display.

Description of Related Art

A backlight module is one of the critical components of a liquid crystal display (LCD). Currently, liquid crystal displays (LCDs) have been widely used in portable electronic products with high-growth potentials such as cell phones, notebook computers, digital cameras, etc. With the trend of portable electronic products toward thinness and lightweight, how to reduce the thickness of the backlight module is an object to which people in the related industries are devoted.

Referring to FIG. 1, FIG. 1 is a schematic cross-sectional view of a conventional backlight module 100. In the design of the conventional backlight module 100, for securing a light guide plate 110, a double faced adhesive tape 120 is disposed on a bottom surface of a light guide plate 110 to attach the light guide plate 110 to a back plate 130. However, because the double faced adhesive tape 120 itself has a thickness, this securing method using the double faced adhesive tape 120 is disadvantageous for thinning the backlight module and the LCD.

Hence, there is a need to provide a light guide assembly, a backlight module and a LCD to meet the trend of portable electronic products.

SUMMARY

One aspect of the present invention is to provide a light guide assembly, a backlight module and a LCD, in which a recess is disposed on an optical surface of a light guide plate to accommodate an adhesive member, such that the adhesive member can be adhered simultaneously to a bottom surface and a sidewall of the recess, thereby increasing the adhesive strength between a light guide plate and a back plate.

Another aspect of the present invention is to provide a light guide assembly, a backlight module and a LCD, in which a recess is disposed on an optical surface of a light guide plate to accommodate an adhesive member, thereby reducing the thickness of the backlight module without affecting the function of the backlight module, further reducing the overall thickness of the LCD to meet the trend of portable electronic products.

According to the aforementioned aspects, the present invention provides a backlight module including a back plate, a light guide plate, an adhesive member and a light source. The light guide plate is disposed on the back plate, in which the light guide plate includes a first optical surface, a second optical surface and a light-incident surface. The second optical surface is opposite to the first optical surface. The light-incident surface connects the first optical surface and the second optical surface. At least one recess is disposed on the first optical surface or the second optical surface of the tight guide plate. The adhesive member is disposed in the recess to adhere the light guide plate to the back plate. The light source is disposed on the back plate to emit light toward the light guide plate.

According to an embodiment of the present invention, the back plate has a holding surface facing the first optical surface, and the light guide plate is adhered to the holding surface by the adhesive member.

According to an embodiment of the present invention, the backlight module further includes a circuit board disposed on the back plate, in which the light guide plate is adhered to the circuit board by the adhesive member.

According to an embodiment of the present invention, the backlight module further includes a reflecting film disposed on the back plate, wherein the light guide plate is adhered to the reflecting film by the adhesive member.

According to an embodiment of the present invention, the adhesive member is corresponding to the recess in shape and size.

According to an embodiment of the present invention, a thickness of the light guide plate is in a range substantially from 0.5 mm to 0.65 mm, a depth of the recess is in a range substantially from 0.05 mm to 0.1 mm, and a thickness of the adhesive member is in a range substantially from 0.05 mm to 0.1 mm.

According to an embodiment of the present invention, the recess is in an elongated stripe shape adjacent to the light-incident surface, in which a longer side of the recess is parallel to the light-incident surface.

According to an embodiment of the present invention, the light guide plate comprises an opposite light incident surface, wherein the opposite light incident surface is opposite to the light-incident surface, and the recess is located adjacent to the opposite light incident surface.

According to the aforementioned aspects, the present invention provides a liquid crystal display including a backlight module and a LCD panel. The backlight module includes a back plate, a light guide plate, an adhesive member and a light source. The light guide plate is disposed on the back plate, in which the light guide plate includes a first optical surface, a second optical surface and a light-incident surface. The second optical surface is opposite to the first optical surface. The light-incident surface connects the first optical surface and the second optical surface. At least one recess is disposed on the first optical surface or the second optical surface of the light guide plate. The adhesive member is disposed in the recess to adhere the light guide plate to the back plate. The light source is disposed on the back plate to emit light toward the light guide plate. The LCD panel disposed above the backlight module.

According to the aforementioned aspects, the present invention provides a light guide assembly including a light guide plate and an adhesive member. The light guide plate includes a first optical surface, a second optical surface and a light-incident surface. The second optical surface is opposite to the first optical surface. The light-incident surface connects the first optical surface and the second optical surface. At least one recess is disposed on the first optical surface or the second optical surface of the light guide plate. The adhesive member is disposed in the recess.

According to an embodiment of the present invention, the light guide plate has a first area and a second area on the two sides of the light guide plate, in which at least one recess is disposed on the first area or the second area.

According to an embodiment of the present invention, the light guide plate further has a third area between the first area and the second area, in which a surface of the adhesive member and a surface of the third area are coplanar.

According to an embodiment of the present invention, the light guide plate further has a third area between the first area and the second area, in which a surface of the adhesive member and a surface of the third area are non-coplanar.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
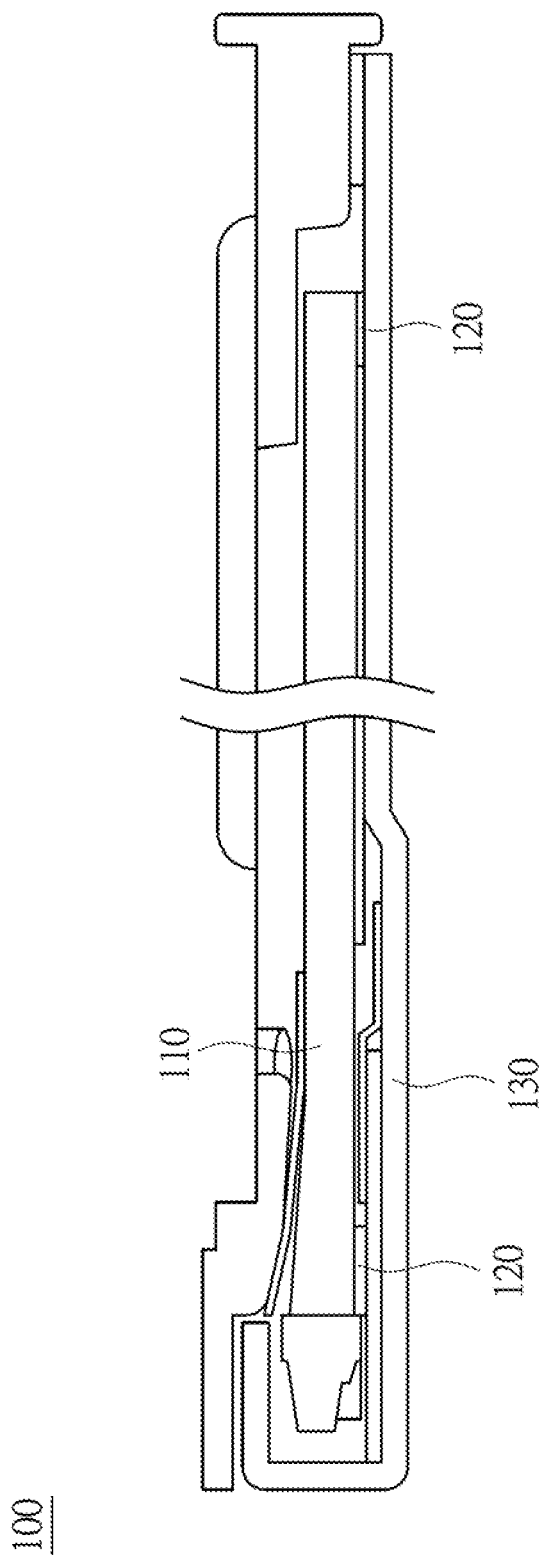
FIG. 1 is a schematic cross-sectional view of a conventional backlight module.

Reference will now be made in detail to the present embodiments of the invention, examples of which are illustrated in the accompanying drawings. Wherever possible, the same reference numbers are used in the drawings and the description to refer to the same or like parts.

Figure 2:
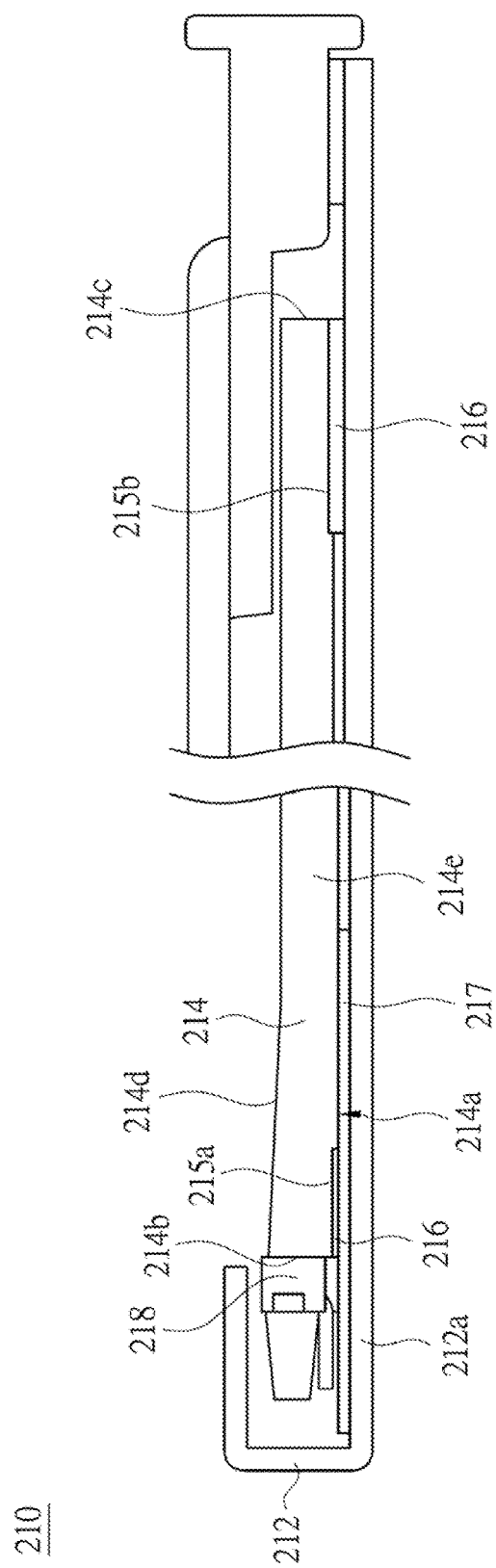
FIG. 2 is a schematic cross-sectional view of a backlight module according to an embodiment of the present invention.
Figure 3:
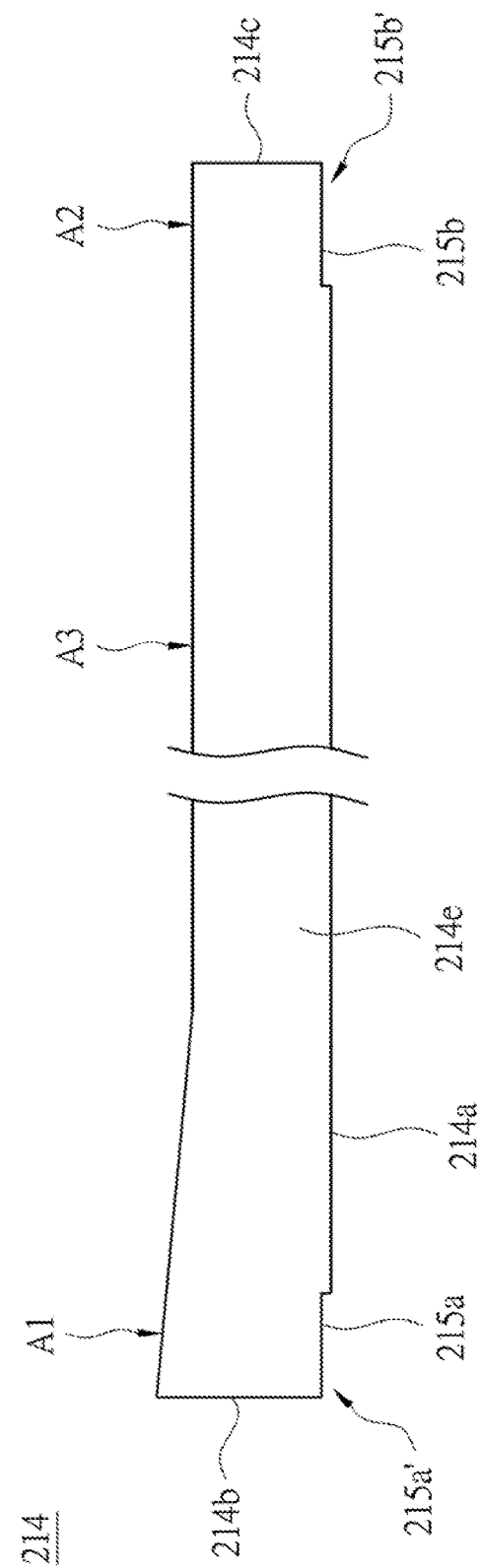
FIG. 3 is a side view of a light guide plate of a backlight module according to an embodiment of the present invention.

Referring to FIG. 2 and FIG. 3, FIG. 2 is a schematic cross-sectional view of a backlight module 210 according to an embodiment of the present invention, and FIG. 3 is a side view of a light guide plate of the backlight module 210 according to an embodiment of the present invention. In the present embodiment, the backlight module 210 mainly includes a back plate 212, a light guide plate 214, an adhesive member 216 and a light source 218.

As shown in FIG. 2, the back plate 212 has a holding surface 212a. The light guide plate 214 is disposed on the holding surface 212a. The light guide plate 214 has a light-incident surface 214b, a first optical surface 214a, a second optical surface 214d and a surrounding surface 214e. The second optical surface 214d is opposite to the first optical surface 214a. The light-incident surface 214b extends along a thickness direction of the light guide plate 214 to connect the first optical surface 214a and the second optical surface 214d. The surrounding surface 214e is connected to the light-incident surface 214b. The light-incident surface 214b and the surrounding surface 214e surround the first optical surface 214a and the second optical surface 214d. In other words, the surrounding surface 214e can be defined as a side surface of the light guide plate 214. The first optical surface 214a faces the holding surface 212a, i.e., the first optical surface 214a is a bottom surface of the light guide plate 214. At least one recess is disposed on the first optical surface 214a, such as recesses 215a and 215b. As shown in FIG. 2, the recesses 215a and 215b are also located on the surrounding surface 214e of the light guide plate 214. The adhesive member 216 can be embedded in the recesses 215a and 215b, and the adhesive member 216 may be aligned with the first optical surface 214a or slightly protrude from the first optical surface 214a. Therefore, the light guide plate 214 can be adhered and fixed in the back plate 212. In one embodiment, the light guide plate 214 can be directly adhered to the holding surface 212a of the back plate 212. In other embodiments, the light guide plate 214 can be adhered to other components, such as flexible circuit boards 417 and 517 or reflecting films 419 and 519 (as shown in FIG. 6-FIG. 9).

The recesses 215a and 215b are preferably disposed at some positions of the light guide plate 214 without affecting the light extraction efficiency of the light guide plate 214. In one embodiment the adhesive member 216 is designed corresponding to the recesses 215a and 215b in shape and size. In other words, the shapes and sizes of the recesses 215a and 215b may be designed in accordance with various types of the adhesive member 216 to change their structure designs, and vice versa.

Figure 4:
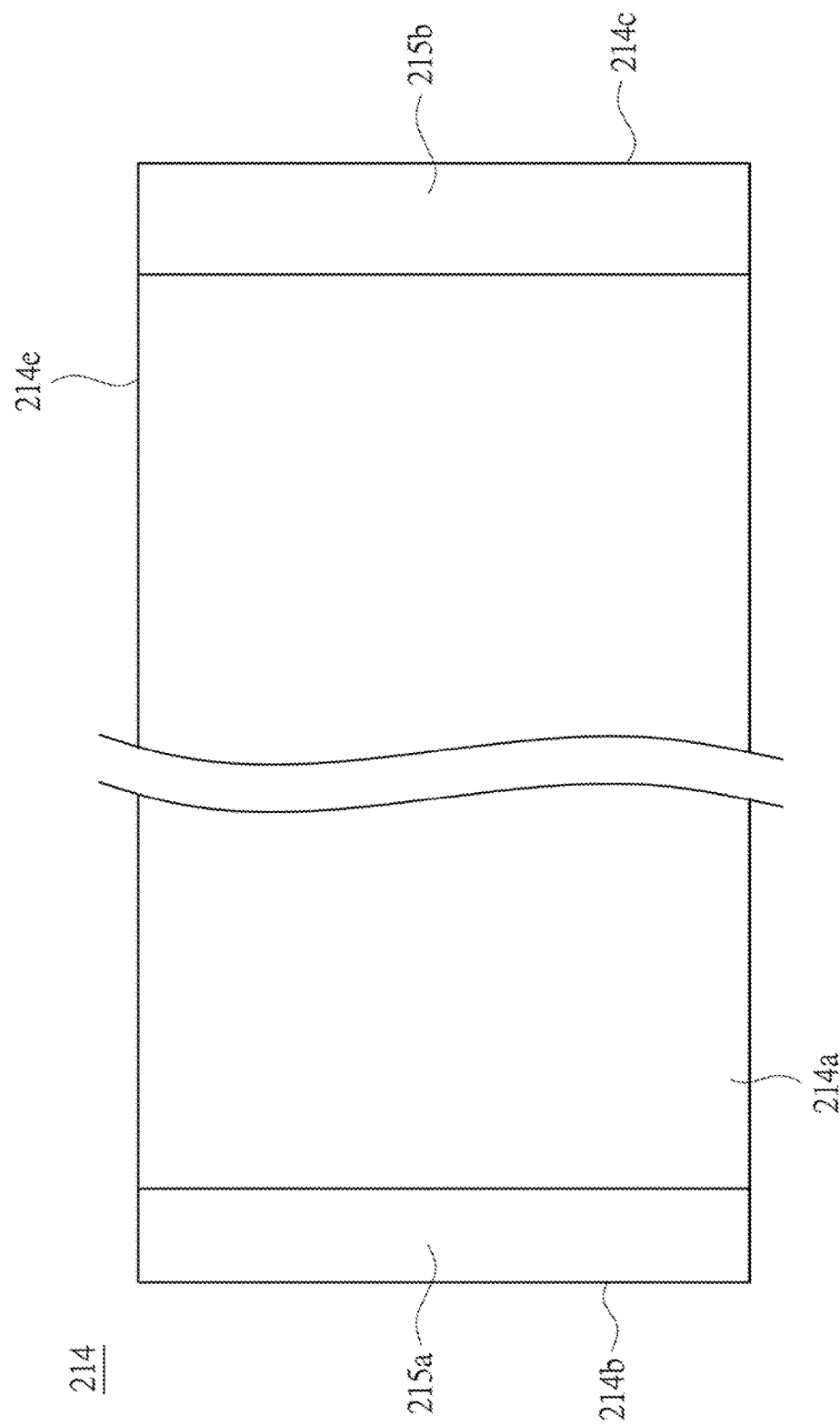
FIG. 4 is a front view of a first optical surface of a light guide plate according to an embodiment of the present invention.

In one embodiment, the backlight module 210 may be an edge-lighting backlight module. The light source 218 is disposed on the back plate 212, and is adjacent to the light-incident surface 214b of the light guide plate 214 so as to emit light toward the light-incident surface 214b. In an exemplary example, the light source 218 may include a light emitting diode (LED). Referring to FIG. 3 and FIG. 4, FIG. 4 is a front view of the first optical surface 214a of the light guide plate 214 according to an embodiment of the present invention. In one embodiment, the recess 215a is in an elongated stripe shape located adjacent to the light-incident surface 214b, and a longer side of the recess 215a is parallel to the light-incident surface 214b. In the present embodiment, the recess 215a has an opening 215a' located at the light-incident surface 214b. As shown in FIG. 3 and FIG. 4, the surrounding surface 214e further includes an opposite light incident surface 214c. The opposite light incident surface 214c and the light-incident surface 214b are on both sides of the light guide plate 214. In one embodiment, the recess 215b is in an elongated stripe shape located adjacent to the opposite light incident surface 214c, and a longer side of the recess 215b is parallel to the opposite light incident surface 214c. In the present embodiment, the recess 215b has an opening 215b' located at opposite light incident surface 214c.

It is noted that the number of the recesses can be adjusted according to actual requirements. Furthermore, the recesses can be disposed on the first optical surface 214a of the light guide plate 214 simultaneously adjacent to the light-incident surface 214b and the opposite light incident surface 214c; on four corners of the first optical surface 214a; or on the edge of the first optical surface 214a. In one embodiment, for matching the component arrangement in the backlight module 210, the recesses can be disposed on the second optical surface 214d of the light guide plate 214. In other embodiments, the recesses can be disposed on the surrounding surface 214e. As long as not affecting light emission of the light source 218, any embodiments with recesses disposed on the first optical surface 214a, the second optical surface 214d or the surrounding surface 214e of the light guide plate 214 in a backlight module to accommodate the adhesive member 216 fall into the scope of the present invention.

As shown in FIG. 3, in the present embodiment, the light guide plate 214 is a wedge plate structure, i.e., the light guide plate 214 has a first area A1 and a second area A2. The first area A1 and the second area A2 are on the two sides of the light guide plate 214, and a thickness of the first area A1 is larger than a thickness of the second area A2. In the present embodiment, the recess may be disposed on the first area A1 or the second area A2. In other embodiments, the light guide plate 214 may be a flat plate structure, i.e., the thickness of the first area A1 and the thickness of the second area A2 are equal.

In one embodiment, the light guide plate 214 has a third area A3 between the first area A1 and the second area A2. When the adhesive member 216 is embedded in the recess, a surface of the adhesive member 216 and a surface of the third area A3 may lie in the same plane. In other embodiments, the surface of the adhesive member 216 and the surface of the third area A3 may lie in different planes.

Referring to Table 1 below, Table 1 is a data table of an optical simulation result in accordance with an embodiment of the present invention. The wedge-shaped light guide plate 214 is used as a tested object, and the recess 215a is disposed on the first optical surface 214a and is located adjacent to the light-incident surface 214b of the light guide plate 214. The data in Table 1 is obtained by simultaneously changing the depth of the recess 215a and the position of the recess 215a corresponding to an opening of the light source. In the optical simulation, a thickness of the light guide plate 214 adjacent to the light-incident surface 214b is about 0.65 mm, a length of an elongated edge parallel to the light-incident surface of the light guide plate 214 is about 201 mm, and a thickness of the adhesive member 216 is in a range from 0.05 mm to 0.1 mm.

TABLE 1

Data table of an optical simulation result in accordance with an embodiment of the present invention

| opening of light source | thickness of light guide plate | recess structure | uniformity | average luminance | effect |
|---|---|---|---|---|---|
| 0.59 mm | 0.65 mm (original thickness) | original structure (no recess) | 75.90% | 10854 | 100% |
| 0.59 mm | 0.55 mm (deduct depth of the recess) | 201* 1* 0.1 mm (The opening of light source is blocked by 0.1 mm.) | 78.96% | 9980 | 91.9% |
| 0.59 mm | 0.6 mm (deduct depth of the recess) | 201* 1* 0.05 mm (The opening of light source is blocked by 0.05 mm.) | 77.86% | 10500 | 96.7% |
| 0.59 mm | 0.6 mm (deduct depth of the recess) | 201* 1* 0.05 mm (The opening of light source is not blocked, and the bottom surface of the recess is at the same elevation with the bottom surface of the light source.) | 76.71% | 10738 | 98.9% |
| 0.59 mm | 0.6 mm (deduct depth of the recess) | 201* 1* 0.05 mm (The opening of light source is not blocked, and the bottom surface of the recess is spaced from the bottom surface of the light source at about 0.05 mm.) | 76.24% | 10831 | 99.8% |

As shown in Table 1, the luminance (i.e. 10854) emitted by the light guide plate without recesses (original structure) is used as a standard. When the recess with thickness of 0.05 mm is disposed on the light guide plate without blocking the opening of the light source 218, the luminance emitted by the light guide plate is smaller than the luminance emitted by the original structure by about 0.2%-1.1%. It can be known from the above that, the light extraction efficiency of the backlight module 210 is not affected by deposing the recess 215a. It is noted that, the overall thickness of the backlight module 210 can be reduced by 10% by deposing the recess 215a.

Referring to Table 2 below, Table 2 is a data table of an optical simulation result in accordance with another embodiment of the present invention. The wedge-shaped light guide plate 214 is used as a tested object, and the recess 215b is disposed on the first optical surface 214a and is located adjacent to the opposite light incident surface 214c of the light guide plate 214. The data in Table 2 is obtained by simultaneously changing the depth of the recess 215b. In the optical simulation, a thickness of the light guide plate 214 adjacent to the opposite light incident surface 214c is about 0.5 mm, a length of an elongated edge which is parallel to the opposite light incident surface of the light guide plate 214 is about 201 mm, and a thickness of the adhesive member 216 is in a range from 0.05 mm to 0.1 mm.

TABLE 2

Data table of an optical simulation result in accordance
with another embodiment of the present invention

| opening of light source | thickness of light guide plate | recess structure | uniformity | average luminance | effect |
|---|---|---|---|---|---|
| 0.59 mm | 0.5 mm (original thickness) | original structure (no recess) | 75.90% | 10854 | 100% |
| 0.59 mm | 0.4 mm (deduct depth of the recess) | 201* 1* 0.1 mm | 78.33% | 10929 | 100.7% |
| 0.59 mm | 0.45 mm (deduct depth of the recess) | 201* 1* 0.05 mm | 75.91% | 10831 | 99.79% |

As shown in Table 2, the luminance (i.e. 10854) emitted by the light guide plate without recesses (original structure) is used as a standard, the light extraction efficiency of the backlight module 210 is not affected by deposing the recess 215b adjacent to the opposite surface 214c of the light guide plate 214. Similarly, the overall thickness of the backlight module 210 can be reduced by 10% by deposing the recess 215b.

Therefore, the thickness of the backlight module 210 can be reduced and the adhesive strength between the light guide plate 214 and the back plate 212 can be enhanced by deposing the recess, such as the recesses 215a and 215b, on first optical surface 214a or the second optical surface 214d of the light guide plate 214 to accommodate the adhesive member 216 and secure the light guide plate 214 in the back plate 212 without affecting the function of the backlight module 210.

Figure 5:
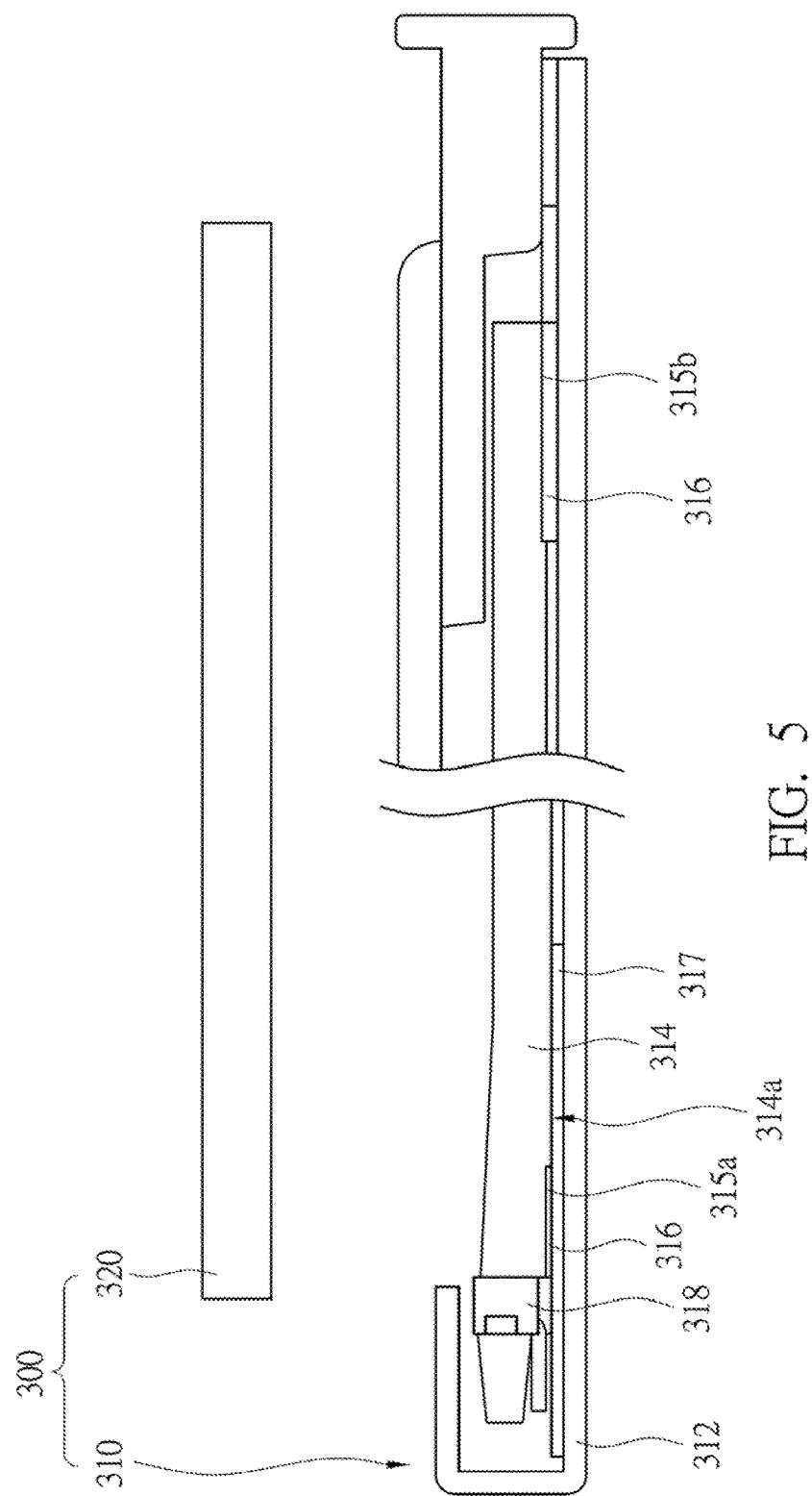
FIG. 5 is a schematic cross-sectional view of a liquid crystal display according to an embodiment of the present invention.

Referring to FIG. 5, FIG. 5 is a schematic cross-sectional view of a liquid crystal display 300 according to an embodiment of the present invention. The liquid crystal display 300 includes a backlight module 310 and a LCD panel 320. The LCD panel 320 is disposed above the backlight module 310. The structure of the backlight module 310 is similar to that of the backlight module 210. The backlight module 310 also includes a back plate 12, a light guide plate 314, an adhesive member 316 and a light source 318, and uses the recess, such as the recesses 315a and 315b, disposed on the first optical surface 314a of the light guide plate 314 to accommodate the adhesive member 316 so as to achieve the same purposes of the aforementioned embodiments, and thus are not described again herein.

In one embodiment, white coverlays 217 and 317 can be disposed under the light guide plates 214 and 314. The white coverlays 217 and 317 are mainly used to replace white reflectors disposed under light guide plates in conventional backlight modules. Because the thickness of a conventional white reflector is 0.05 mm under the condition of reflection rate of 83.6%, the thickness of the backlight modules 210 and 310 can be further reduced by replacing the respective white reflectors with the white coverlays 217 and 317. Referring to Table 3, Table 3 is a comparison table between the reflection rate of the white reflector and that of the white coverlay 217 or 317.

TABLE 3 comparison of reflection rates between
white reflector and white coverlay

| sample | white reflector | white coverlay |
|---|---|---|
| 1 | 82.9% | 83.03% |
| 2 | 82.19% | 84.01% |
| 3 | 81.7% | 83.78% |
| Average | 82.06% | 83.61% |

As shown in Table 3, the white coverlays 217 and 317 used to replace the white reflectors not only do not affect the overall light reflection rate but reduce the thickness of the respective backlight modules.

Figure 6:
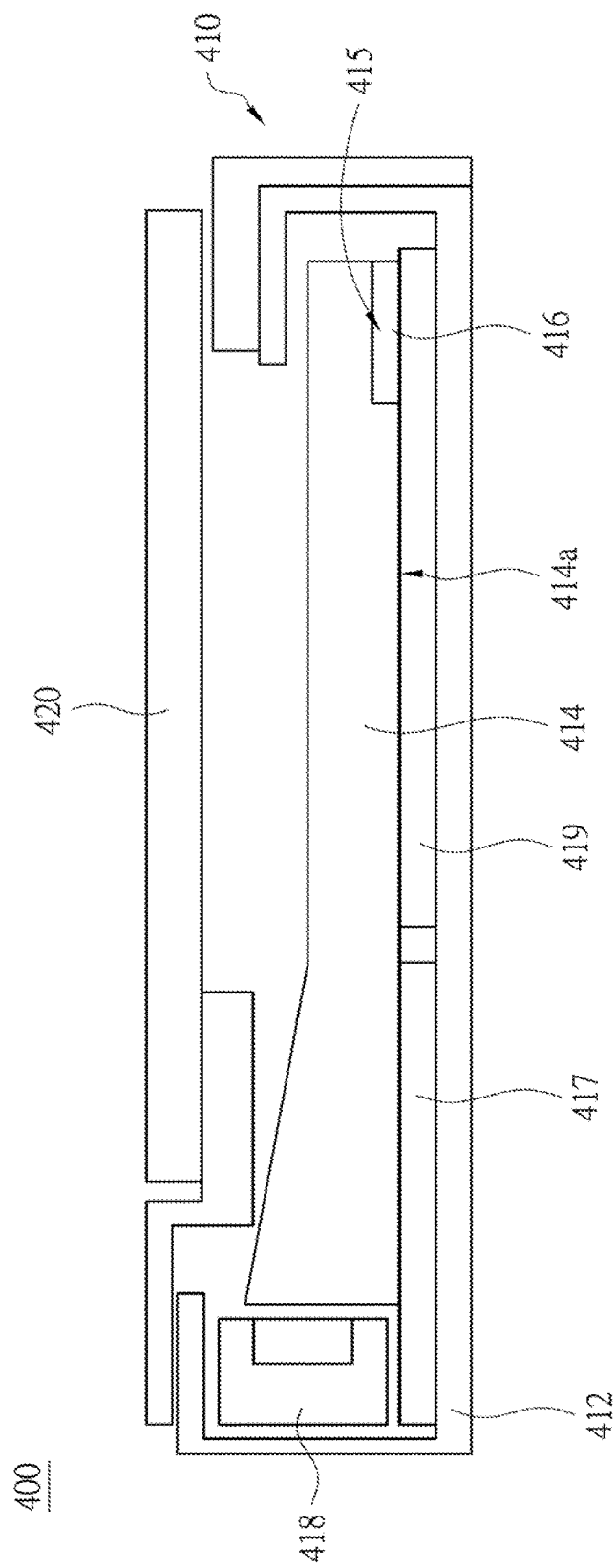
FIG. 6-FIG. 9 are schematic cross-sectional views showing liquid crystal displays according to other embodiments of the present invention.
Figure 7:
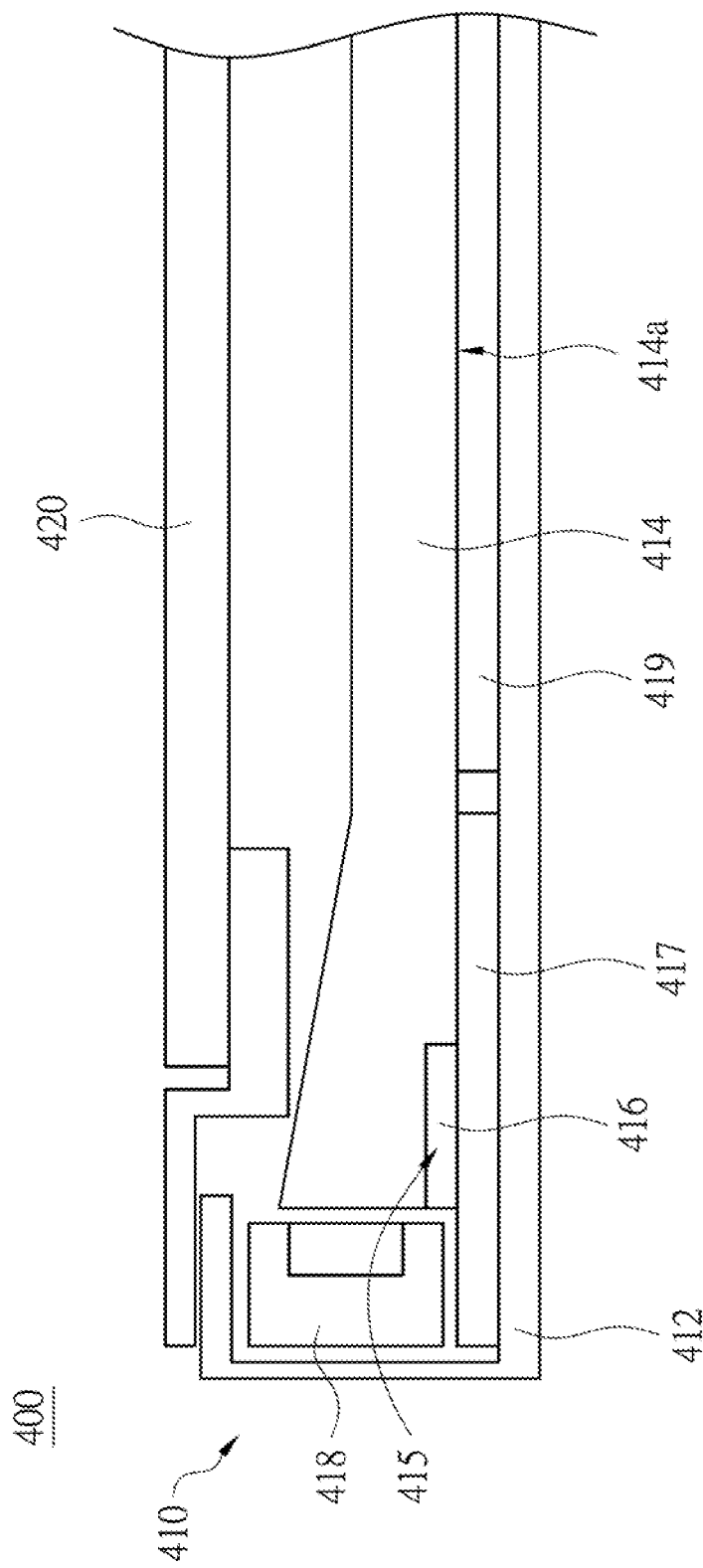

Referring to FIG. 6 and FIG. 7, FIG. 6 and FIG. 7 are schematic cross-sectional views showing a liquid crystal display 400 according to other embodiments of the present invention. In FIG. 6, the liquid crystal display 400 includes a backlight module 410 and a LCD panel 420. The LCD panel 420 is disposed above the backlight module 410. The structure of the backlight module 410 is similar to the structure of the backlight module 210. The backlight module 410 includes a back plate 412, a light guide plate 414, an adhesive member 416, a flexible circuit board 417, a light source 418 and a reflecting film 419. The flexible circuit board 417 and the reflecting film 419 are disposed under the light guide plate 414. A recess 415 is disposed on an optical surface 414a facing the reflecting film 419 of the light guide plate 414 for accommodating the adhesive member 416 to secure the light guide plate 414 on the reflecting film 419.

As shown in FIG. 6, the recess 415 is disposed on the light guide plate 414 adjacent to the opposite light incident surface. In other embodiments, as shown in FIG. 7, the recess 415 may be disposed on the light guide plate 414 adjacent to the light source 418. Therefore, the adhesive member 416 disposed in the recess 415 can secure the light guide plate 414 on the flexible circuit board 417.

Figure 8:
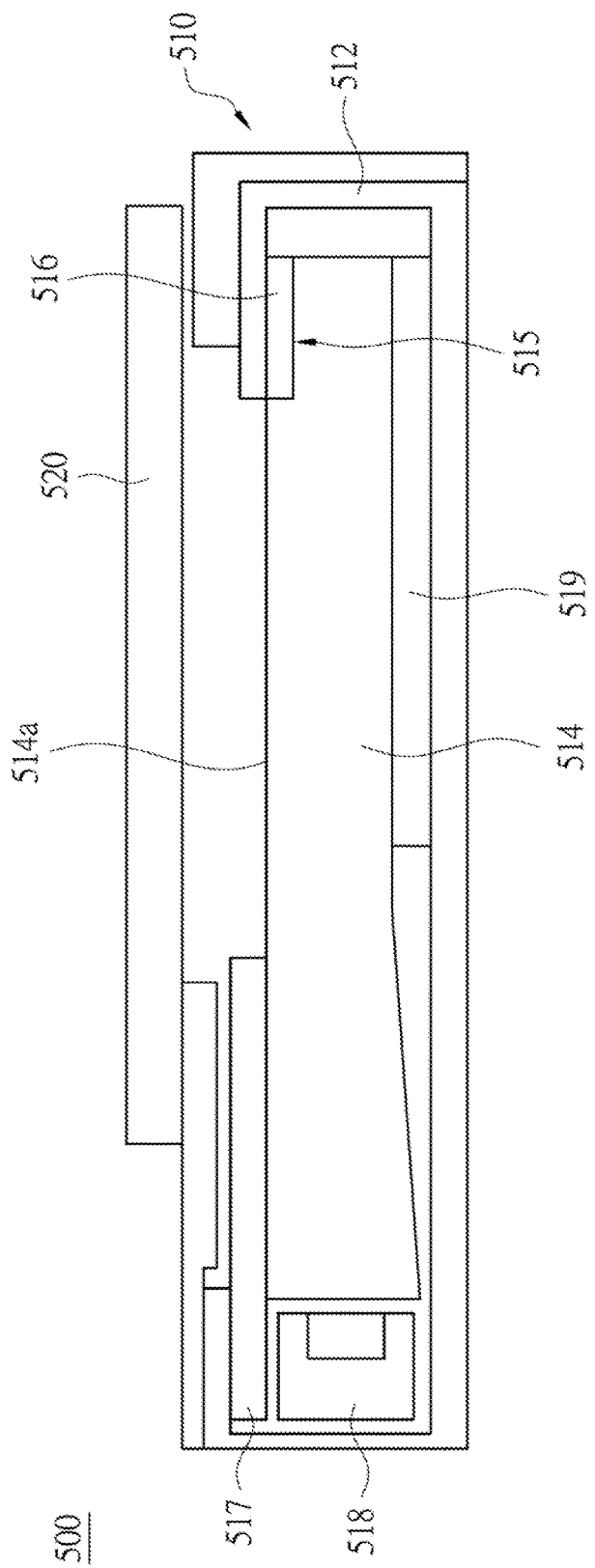
Figure 9:
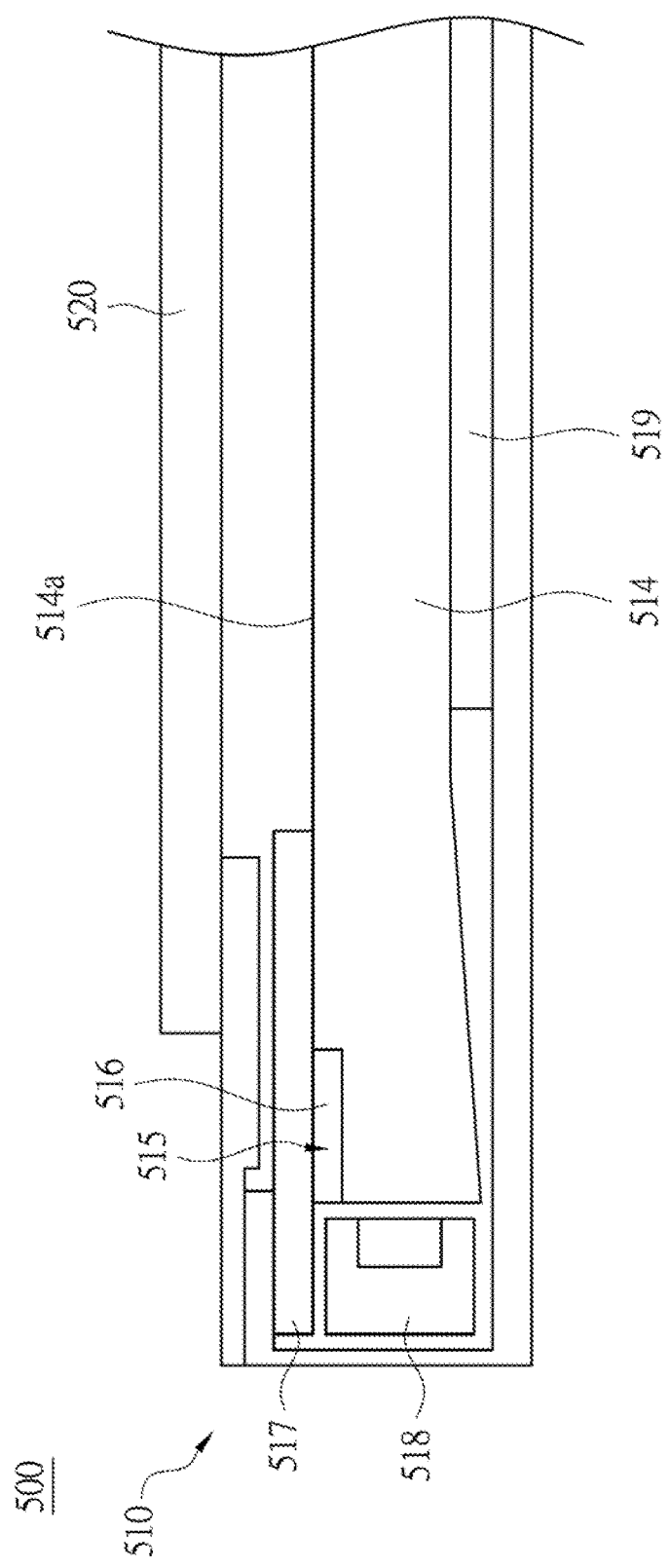

Referring to FIG. 8 and FIG. 9, FIG. 8 and FIG. 9 are schematic cross-sectional views showing a liquid crystal display 500 according to other embodiments of the present invention. In FIG. 8, the liquid crystal display 500 includes a backlight module 510 and a LCD panel 520. The LCD panel 520 is disposed above the backlight module 510. The structure of the backlight module 510 is similar to the structure of the backlight module 210. The backlight module 510 includes a back plate 512, a light guide plate 514, an adhesive member 516, a flexible circuit board 517, a light source 518 and a reflecting film 519. The flexible circuit board 517 is disposed above the light guide plate 514 and the reflecting film 519 is disposed under the light guide plate 514. A recess 515 is disposed on an optical surface 514a facing the flexible circuit board 517 of the light guide plate 514 for accommodating the adhesive member 516 to secure the light guide plate 514 on the frame of the back plate 512.

As shown in FIG. 8, the recess 515 is disposed on the light guide plate 514 adjacent to the opposite light incident surface. In other embodiments, as shown in FIG. 9, the recess 515 may be disposed on the light guide plate 514 adjacent to the light source 518. Therefore, the adhesive member 516 disposed in the recess 515 can secure the light guide plate 514 on the flexible circuit board 517.

Figure 10:
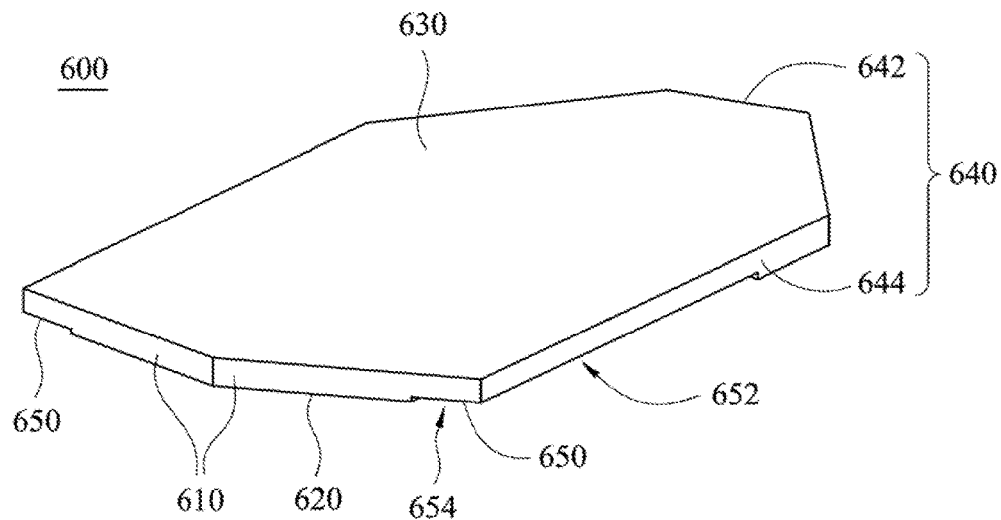
FIG. 10 is a schematic structural diagram of a light guide plate according to another embodiment of the present invention.
Figure 11:
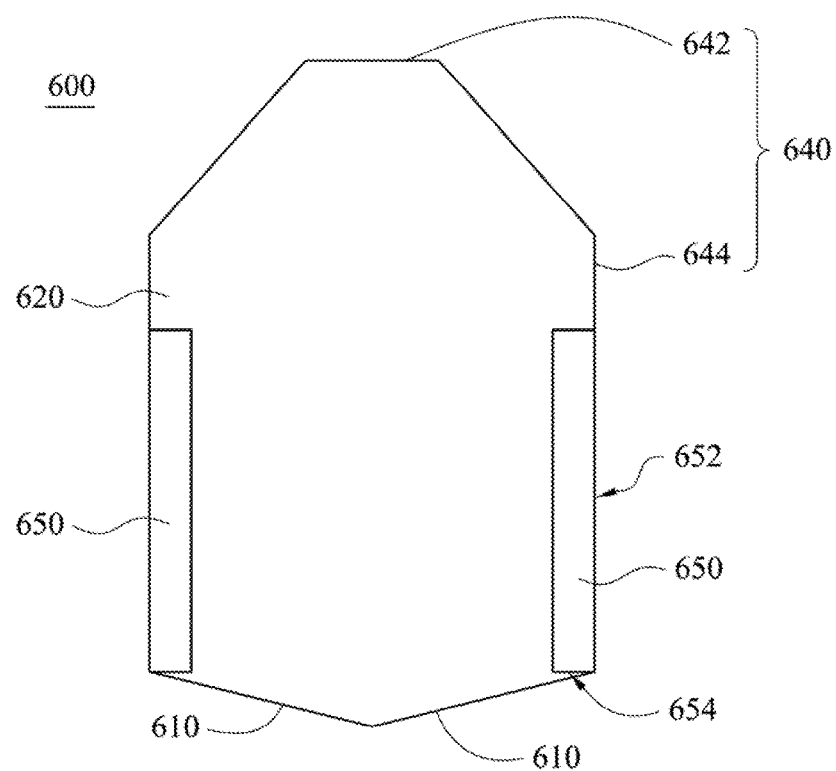
FIG. 11 is a bottom view of the light guide plate according to another embodiment of the present invention.
Figure 12:
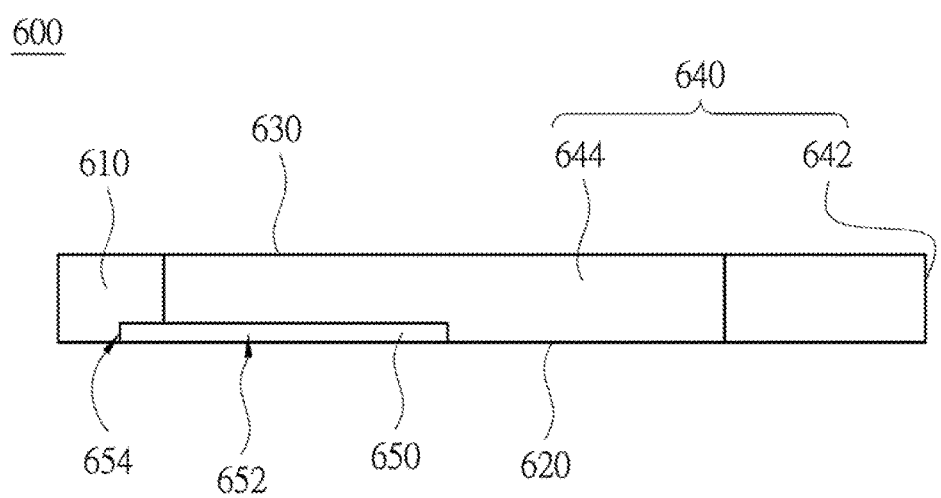
FIG. 12 is a side view of the light guide date according to another embodiment of the present invention.

In the present invention, the light guide plate can be different shape structure other than the shape shown in previous embodiments. Referring to FIG. 10, FIG. 11 and FIG. 12, FIG. 10, FIG. 11 and FIG. 12 are a schematic structural diagram, a bottom view and a side view of a light guide plate 600 according to another embodiment of the present invention. The light guide plate 600 includes a light-incident surface 610, a first optical surface 620, a second optical surface 630 and a surrounding surface 640. The second optical surface 630 is opposite to the first optical surface 620. The light-incident surface 610 extends along a thickness direction of the light guide plate 600 to connect the first optical surface 620 and the second optical surface 630. The surrounding surface 640 is connected to the light-incident surface 610. The light-incident surface 610 and the surrounding surface 640 surround the first optical surface 620 and the second optical surface 630.

Referring to FIG. 10, FIG. 11 and FIG. 12 again, in the present embodiment, at least one recess 650 is disposed on the surrounding surface 640 of the light guide plate 600. Moreover, the surrounding surface 640 includes an opposite light incident surface 642 and plural side surfaces 644. The side surfaces 644 are located between the light-incident surface 610 and the opposite light incident surface 642. In one embodiment, the recess 650 is located adjacent to at least one of the side surfaces 644. The recess 650 has a first opening 652 and a second opening 654, in which the first opening 652 is located at the at least one of the side surfaces 644, and the second opening 654 is located at the light-incident surface 610. As shown in FIG. 11, in some embodiments, the recess 650 is in an elongated stripe shape, and a longer side of the recess 650 is parallel to the at least one of the side surfaces 644.

Figure 13:
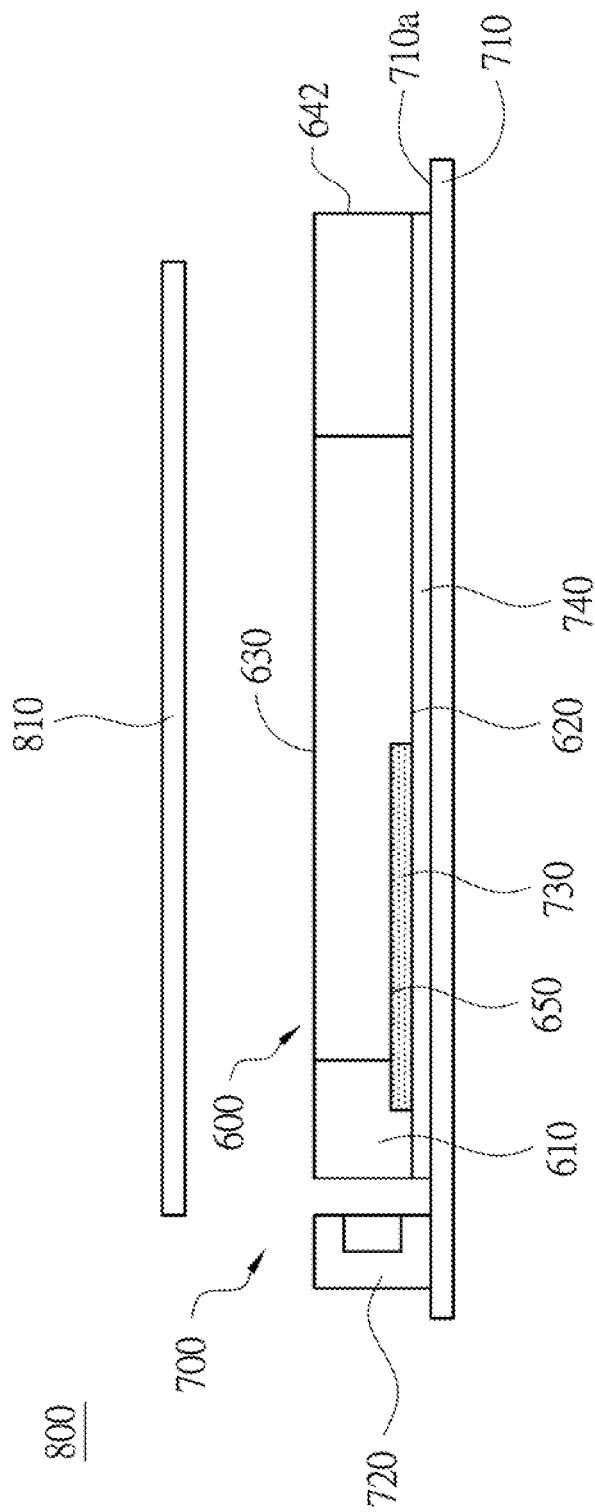
FIG. 13 is a side view of a liquid crystal display according to another embodiment of the present invention.

Referring to FIG. 13, FIG. 13 is a side view of a liquid crystal display 800 according to another embodiment of the present invention. The liquid crystal display 800 includes a backlight module 700 and a liquid crystal display panel 810. The liquid crystal display panel 810 is disposed above the backlight module 700. In the present embodiment, the backlight module 700 includes a back plate 710, a light source 720, an adhesive member 730, a reflecting film 740 and the light guide plate 600 as shown in FIG. 10. As shown in FIG. 13, the reflecting file 740 is disposed on the back plate 710 and the light guide plate 600 is adhered to the reflecting film 740 by the adhesive member 730. The light source 720 is disposed adjacent to the light-incident surface 610 of the light guide plate 600 to emit light towards the light guide plate 600.

It is noted that, the embodiment shown in FIG. 13 showing that light guide plate 600 is adhered to the reflecting film 740 by the adhesive member 730, is merely used as an example for explanation, and other embodiments of the present invention are not limited thereto. In other embodiments, the light guide plate 600 can be directly adhered to a holding surface 710a of the back plate 710, or the light guide plate 600 can be adhered to a circuit board, so as to reduce the overall thickness of the backlight module 700 as well as the liquid crystal display 800.

According to the aforementioned embodiments of the present invention, one advantage of the present invention is to dispose a recess on an optical surface of a light guide plate to accommodate an adhesive member, thus attaching the adhesive member simultaneously to a bottom surface and a sidewall of the recess, and increasing the adhesive strength between a light guide plate and a back plate.

According to the aforementioned embodiments of the present invention, another advantage of the present invention is to dispose a recess on an optical surface of a light guide plate to accommodate an adhesive member, thus reducing overall thickness of backlight module without affecting the function of the backlight module. When the mounting technology of LED is advanced to decrease the mounting height of the LED, the embodiments of the present invention can be applied to reduce the overall thickness of the backlight module and achieve an object of thinness and lightweight.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
    a light guide plate comprising:
    a first optical surface;
    a second optical surface opposite to the first optical surface;
    a light-incident surface extending along a thickness direction of the light guide plate to connect the first optical surface and the second optical surface;
    a light source which emits light towards the light guide plate;
    an adhesive member; and
    a back plate, wherein the back plate has a holding surface facing the first optical surface, and the light guide plate is adhered to the holding surface by the adhesive member;
    wherein the light guide plate has a first area, a second area and a third area, wherein the first area and the second area are on the two sides of the light guide plate, and the third area is located between the first area and the second area, wherein a surface of the adhesive member and a surface of the third area are coplanar.

2. A liquid crystal display, comprising:
    a backlight module of claim 1, and
    a liquid crystal display panel disposed above the backlight module.

3. A backlight module, comprising:
    a light guide plate, comprising:
    a first optical surface;
    a second optical surface opposite to the first optical surface; and
    a light-incident surface extending along a thickness direction of the light guide plate to connect the first optical surface and the second optical surface;

wherein at least one recess is disposed on the first optical surface or the second optical surface of the light guide plate;

a light source which emits light towards the light guide plate;

an adhesive member disposed in the recess; and a circuit board, wherein the light guide plate is adhered to at least one component of the backlight module by the adhesive member other than being adhered to the circuit board by the adhesive member.

4. The backlight module of claim 3, wherein the recess is adjacent to the light-incident surface, and the recess has an opening which is located at the light incident surface.

5. The backlight module of claim 3, wherein the light guide plate further comprises an opposite light incident surface opposite to the light-incident surface, and the recess is located adjacent to the opposite light incident surface, and the recess has an opening which is located at the opposite light incident surface.

6. The backlight module of claim 3, wherein the light guide plate further comprises an opposite light incident surface and a plurality of side surfaces between the light-incident surface and the opposite light incident surface, and the recess has a first opening and a second opening, wherein the first opening is located at the at least one of the side surfaces, and the second opening is located at the light-incident surface.

7. The backlight module of claim 3, further comprising a back plate, wherein the back plate has a holding surface facing the first optical surface, and the light guide plate is adhered to the holding surface by the adhesive member.

8. The backlight module of claim 3, further comprising a reflecting film, wherein the light guide plate is adhered to the reflecting film by the adhesive member.

9. A liquid crystal display, comprising:
a backlight module of claim 3, and
a liquid crystal display panel disposed above the backlight module.

10. A backlight module, comprising:
a light guide plate, comprising:
a first optical surface;
a second optical surface opposite to the first optical surface; and
a light-incident surface extending along a thickness direction of the light guide plate to connect the first optical surface and the second optical surface;
a light source which emits light towards the light guide plate;
an adhesive member; and
a circuit board, wherein the light guide plate is adhered to at least one component of the backlight module by the adhesive member other than being adhered to the circuit board by the adhesive member;
wherein the light guide plate has a first area, a second area and a third area, wherein the first area and the second area are on the two sides of the light guide plate, and the third area is located between the first area and the second area, wherein a surface of the adhesive member and a surface of the third area are coplanar.

11. A liquid crystal display, comprising:
a backlight module of claim 10, and
a liquid crystal display panel disposed above the backlight module.

* * * * *